Aug. 13, 1929.  J. M. JOSEPH  1,724,026
GARDEN TOOL
Filed April 6, 1927
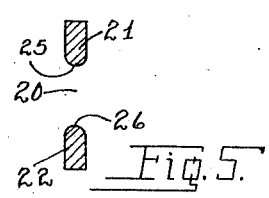
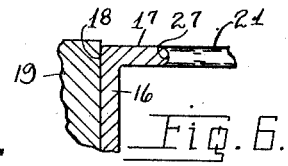
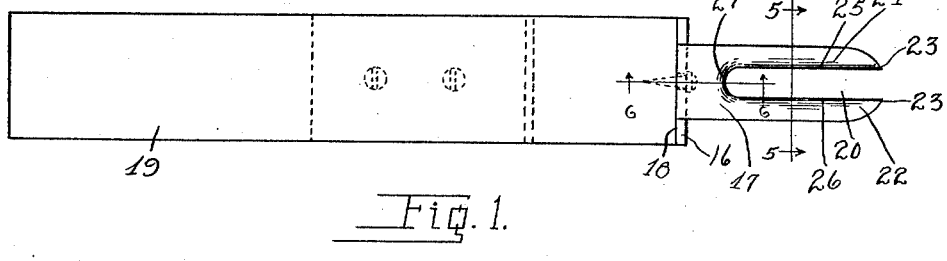
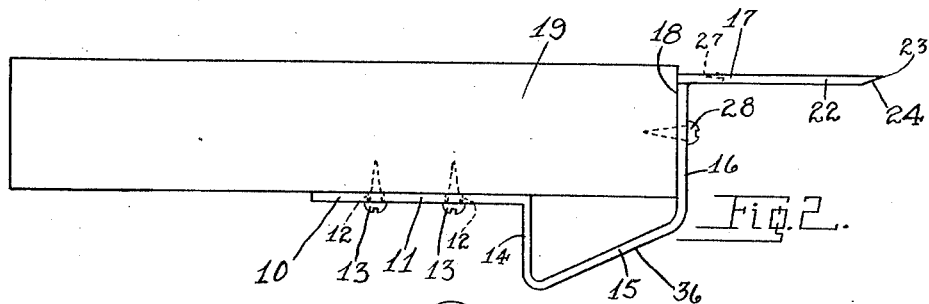
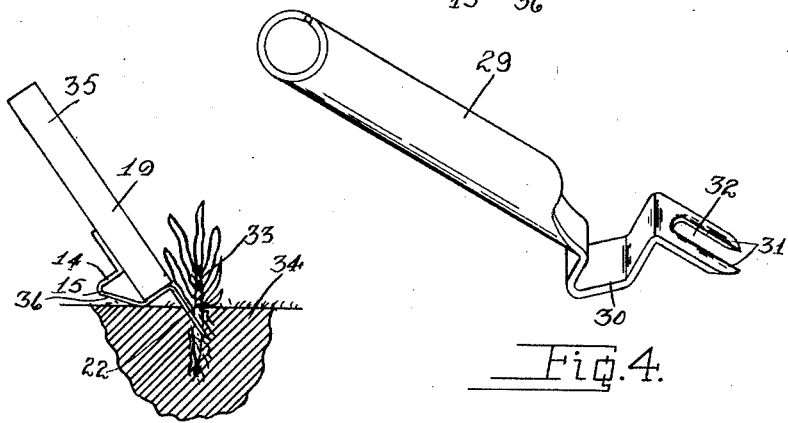
Inventor
JESSE M. JOSEPH
By Murray and Gugelter
Attorneys

Patented Aug. 13, 1929.                                          1,724,026

UNITED STATES PATENT OFFICE.

JESSE M. JOSEPH, OF CINCINNATI, OHIO.

GARDEN TOOL.

Application filed April 6, 1927. Serial No. 181,535.

An object of this invention is to provide a tool for removing weeds and other undesirable grasses and plants from lawns and gardens.

Another object of this invention is to provide a combined garden tool for removing or pulling out weeds and the like and for tamping the earth after the weed has been removed.

Another object of this invention is to provide a garden tool, for the purposes above stated, that has its pulling prongs rounded off so that the said weed is pulled from the ground or soil and is not sheared or cut at or near the surface of the soil.

Another object of this invention is to provide a garden tool that is inexpensive to manufacture, yet efficient in operation.

These and other objects are attained by the means described herein and disclosed in the accompanying drawings, in which:

Fig. 1 is a fragmental plan view of a garden tool embodying this invention.

Fig. 2 is a fragmental elevational view of the tool shown in Fig. 1.

Fig. 3 is a side view of the tool showing it in an operative position.

Fig. 4 is a fragmental perspective view of a modified form of garden tool embodying this invention.

Fig. 5 is an enlarged sectional view taken on line 5—5 of Fig. 1.

Fig. 6 is an enlarged sectional view taken on line 6—6 of Fig. 1.

The garden tool comprises a strip of metal 10 having a shank or body portion 11 provided with suitable perforations 12 through which fastening means such as screws 13 extend. The shank or body portion 11 has its one end bent perpendicularly to provide a fulcrum arm 14 having a base 15. The metal strip 10 at the other end of the fulcrum base 15 is formed parallel with the fulcrum arm 14, as shown at 16. The free end 17 of the strip 10, extending from the arm 16, projects beyond the edge 18 of a handle 19 and may be provided with a slot 20 whereby a fork comprising a pair of prongs 21 and 22 is formed. It should be noted that arms 14 and 16 are of unequal length whereby the base 15 extending between them is disposed at an angle to the handle 19. The prongs 21 and 22 have a portion of their metal removed at the forward end so that suitable points 23 are formed on the prongs. It should be noted that the prongs are also cut away at 24 to provide the points 23 which points facilitate inserting the prongs into the earth or ground. The inner edges 25 and 26 of the prongs 21 and 22 are rounded off so that no sharp edge exists to shear the weed or other undesirable growth that is being removed from the soil, see Fig. 5. The base 27 of the slot 20, or that portion of the end 17 that joins the prongs together, is also rounded, as seen in Figs. 1 and 6. This rounded shoulder or base 27 limits the extent to which the tool may be inserted into the ground, and the rounded shoulder prevents the weed or the like upon contacting the said shoulder 27 from being sheared or cut off.

The foregoing garden tool is secured to a suitable handle 19 by means of the crews 13 which extend through the shank 11 and by means of a screw or other suitable fastening device 28 which extends through the arm 16 into the handle.

The modification shown in Fig. 4 comprises a garden tool formed of a strip of metal having a hand grip or handle 29 formed at one end, in lieu of the shank 11 shown in Figs. 1 and 2, and a fulcrum 30 extending from the hand grip 29. The prongs 31 are formed at the free end of the fulcrum 30 by a suitable slot 32 therein and the inner edges and base of the prongs are rounded off the same as that described above and shown in Figs. 5 and 6.

The operation of the tool is shown in Fig. 3. When it is desired to remove a weed or other undesirable grass or growth 33 from the earth or ground 34 the prongs 21 and 22 are inserted in the ground having the weed 33 between them and the fulcrum 15 resting upon the upper surface of the ground. By bearing down upon the upper end 35 of the handle 19 the garden tool is actuated about the fulcrum 15 and the weed lifted or raised from the earth. After the weed has been removed the base or flat surface 36 of the fulcrum 15 may be used to tamp the ground loosened in the operation of removing the undesirable weed or the like.

It should be noted that by making the inner edges and base of the prongs round, or devoid of sharp edges, the weeds or the like are removed from the soil by pulling and lifting and are not sheared off at or near the surface of the soil as is the case with the weeders now generally employed.

What I claim is—

1. A tool of the class described comprising an integral body having an intermediate fulcrum member with parallel arms and an inclined base, a handle receiving shank and a fork extending in opposite directions and in parallelism, the fork being in a higher plane than the shank, and being connected one each to the free ends of the parallel arms.

2. A weeding tool comprising a fulcrum member having spaced arms, a weed engaging fork extending outwardly at right angles from one of said arms and a handle shank extending outwardly in the opposite direction at right angles from the other of said arms the fork being in a higher plane than the shank, and, the body of the tool intermediate the arms being angularly disposed with relation to the arms, fork and shank, and serving as a tamper for the soil.

In testimony whereof, I have hereunto subscribed my name this 30th day of March, 1927.

JESSE M. JOSEPH.